(12) United States Patent
Jäger (10) Patent No.: US 7,792,606 B2
(45) Date of Patent: Sep. 7, 2010

(54) SYSTEM FOR ASSIGNING ONE OF MANY PART DOMAINS IN A DOMAIN TO ONE OF MANY MOBILE UNITS

(75) Inventor: Markus Jäger, München (DE)

(73) Assignee: Siemens Aktiengesellschaft, Munich (DE)

(*) Notice: Subject to any disclaimer, the term of this patent is extended or adjusted under 35 U.S.C. 154(b) by 873 days.

(21) Appl. No.: 10/492,303

(22) PCT Filed: Oct. 2, 2002

(86) PCT No.: PCT/DE02/03738

§ 371 (c)(1),
(2), (4) Date: Apr. 12, 2004

(87) PCT Pub. No.: WO03/033218

PCT Pub. Date: Apr. 24, 2003

(65) Prior Publication Data

US 2004/0249511 A1    Dec. 9, 2004

(30) Foreign Application Priority Data

Oct. 11, 2001 (DE) .............................. 101 50 423

(51) Int. Cl.
*G06F 19/00* (2006.01)
(52) U.S. Cl. .................. 700/245; 700/248; 700/255; 700/262; 901/6; 901/8; 901/40; 901/47
(58) Field of Classification Search .............. 700/245, 700/248, 255, 262; 901/6, 8, 40, 47
See application file for complete search history.

(56) References Cited

U.S. PATENT DOCUMENTS 4,887,223 A * 12/1989 Christian ..................... 382/153

(Continued)

FOREIGN PATENT DOCUMENTS

DE    198 04 195    8/1999

(Continued)

OTHER PUBLICATIONS

S. Hert and V. Lumelsky, Polygon Area Decomposition for Multiple-Robot Workspace Division, Special Issue of International Journal of Computational Geometry & Applications on Applied Computational Geometry, vol. 8, No. 4, pp. 437-466, 1998.*

(Continued)

*Primary Examiner*—Khoi Tran
*Assistant Examiner*—Jorge O Peche
(74) *Attorney, Agent, or Firm*—Staas & Halsey LLP (57) ABSTRACT

A partial surface of a total surface, divided into several partial surfaces, is allocated to one of several mobile units by determining the partial surface of the total surface and allocating one of the several mobile units with a reservation. The mobile unit transmits allocation information indicating the allocation of the partial surface. The reservation is lifted and the allocation of the partial surface is validated when the one of the several mobile units receives no allocation rejection information from at least one of the other mobile units, indicating a rejection of the allocation of the partial surface. If rejection information is received, the reservation is lifted and the allocation of the partial surface is invalidated.

13 Claims, 5 Drawing Sheets

U.S. PATENT DOCUMENTS

| | | | | |
|---|---|---|---|---|
| 5,379,320 | A | * | 1/1995 | Fernandes et al. ............ 375/141 |
| 5,416,906 | A | * | 5/1995 | Mariani ....................... 700/248 |
| 5,819,008 | A | * | 10/1998 | Asama et al. ................ 700/255 |
| 6,240,342 | B1 | | 5/2001 | Fiegert et al. |
| 6,580,246 | B2 | * | 6/2003 | Jacobs ................... 318/568.16 |
| 6,597,143 | B2 | * | 7/2003 | Song et al. ................... 318/581 |
| 6,941,191 | B2 | * | 9/2005 | Jaeger ........................ 700/245 |
| 7,173,391 | B2 | * | 2/2007 | Jones et al. ............ 318/568.12 |
| 7,209,803 | B2 | * | 4/2007 | Okamoto et al. ............ 700/245 |
| 2002/0060542 | A1 | * | 5/2002 | Song et al. ............. 318/568.12 |
| 2003/0025472 | A1 | * | 2/2003 | Jones et al. ............ 318/568.12 |
| 2003/0236590 | A1 | * | 12/2003 | Park et al. .................... 700/245 |
| 2004/0207355 | A1 | * | 10/2004 | Jones et al. ............ 318/568.12 |
| 2005/0071047 | A1 | * | 3/2005 | Okabayashi et al. ......... 700/245 |
| 2006/0095158 | A1 | * | 5/2006 | Lee et al. ..................... 700/245 |
| 2007/0100500 | A1 | * | 5/2007 | Abramson et al. ........... 700/245 |

FOREIGN PATENT DOCUMENTS

| | | |
|---|---|---|
| JP | 59-205601 | 11/1984 |
| JP | 61-260306 | 11/1986 |
| JP | 05-233059 | 9/1993 |
| JP | 6-23927 | 2/1994 |
| JP | 07-093028 | 4/1995 |
| JP | 8-036410 | 2/1996 |
| JP | 2000-254837 | 9/2000 |
| JP | 2000-353013 | 12/2000 |
| WO | 00/58800 | 10/2000 |
| WO | 02/082195 A2 | 10/2002 |

OTHER PUBLICATIONS

Territorial multi-robot task division Schneider-Fontan, M.; Mataric, M.J.; Robotics and Automation, IEEE Transaction on vol. 14 Issue 5, Oct. 1998 pp. 815-822 Digital Object Identifier 10.1109/70.720357.*

Hert et al. (Pub: Polygon Area Decomposition for Multiple-Robot Workspace Division, Special Issue of International Journal of Computational Geometry & Applications on Applied Computational Geometry, vol. 8, No. 4, pp. 437-466, 1998).*

Schneider-Fontan et al. (Pub: Territorial multi-robot task division Robotics and Automation, IEEE Transactions on vol. 14, Issue 5, Oct. 1998 pp. 815-822 Digital Object Identifier 10.1109/70.720357).*

Hannah Bast et al., "The Area Partitioning Problem", Proceedings of the 12$^{th}$ Canadian Conference on Computational Geometry, 2000, pp. 163-171.

Hajime Asama et al., "Collision Avoidance among Multiple Mobile Robots Based on Rules and Communication", Proceedings of the IEEE/RSJ International Workshop on Intelligent Robots and Systems IROS '91, Nov. 3-5, 1991, pp. 1215-1220.

Koichi Ozaki et al., "Sychronized Motion by Multiple Mobile Robots using Communication", Proceedings of the 1993 IEEE/RSJ International Conference on Intelligent Robots and Systems, Jul. 26-30, 1993, pp. 1164-1170.

G. Schmidt et al., "An Advanced Planning and Navigation Approach for Autonomous Cleaning Robot Operations", Proceedings of the 1998 IEEE/RSJ International Conference on Intelligent Robots and Systems, Oct. 1998, pp. 1230-1235.

Steven M. LaValle et al., "Optimal Motion Planning for Multiple Robots Having Independent Goals", IEEE Transaction on Robotics and Automation, vol. 14, No. 6, Dec. 1998, pp. 912-925.

Yoshikazu Arai et al., "Adaptive Behavior Acquisition of Collision Avoidance among Multiple Autonomous Mobile Robots", IEEE/RSJ International Conference on Intelligent Robots and Systems, Grenoble, France, Sep. 7-11, 1997, pp. 1762-1767.

Reid G. Smith, "The Contract Net Protocol: High-Level Communication and Control in a Distributed Problem Solver", IEEE Transactions on Computers, vol. C-29, No. 12, Dec. 1980, pp. 1104-1113.

Ernest Chang et al., "An Improved Algorithm for Decentralized Extrema-Finding in Circular Configurations of Processes", Communications of the ACM, vol. 22, 1979, pp. 281-283.

Markus Jäger et al., "Decentralized Collision Avoidance, Deadlock Detection and Deadlock Resolution for Multiple Mobile Robots", International Conference on Intelligent Robots and Systems (IROS), 2001, pp. 1213-1219.

Ioannis T. Christou et al., "Optimal Equi-Partition of Rectangular Domains for Parallel Computation", Journal of Global Optimization, vol. 8, Jan. 1996, pp. 15-34.

Ioannis T. Christou, "Distributed Genetic Algorithms for Partitioning Uniform Grids", University of Wisconsin-Madison, Department of Computer Science, Technical Report MP-TR-96-09, 1996, pp. i-vi, 1-22, 61-70 & 100-109.

Jonathan Yackel et al., "Minimum-Perimeter Domain Assignment", Mathematical Programming, vol. 78, No. 2, Aug. 1997, pp. 283-303.

Esther M. Arkin et al., "Approximation Algorithms for Lawn Mowing and Milling", Technical Report No. 97.255, Mathematical Institute, Universität zu Köln, 1997, pp. 1-.

Marshall Bern et al., "Linear-size Nonobtuse Triangulation of Polygons", Discrete and Computational Geometry, vol. 14, 1995, pp. 411-428.

Susan Hert et al., "Multiple-Robot Motion Planning = Parallel Processing + Geometry", 2001, pp. 1-19.

Hermann Endres et al., "Field Test of a Navigation System: Autonomous Cleaning in Supermarkets", Proceedings of the 1998 IEEE International Conference on Robotics & Automation (ICRA), May 1998, pp. 1779-1781.

J.C. Latombe, "Robot Motion Planning", Kluwer Academic Publishers, Boston, 1991, pp. 14-19.

Minutes from the Japanese Office Action issued on Jun. 29, 2009 in corresponding Japanese Patent Application 2007-33292.

* cited by examiner

| Column | 1 | 2 | 3 | 4 | 5 | 6 |
|---|---|---|---|---|---|---|
| | $r_{com}$ | n | double polygons | | double polygons (average) | |
| | | | allocated | processed | allocated | processed |
| 600 | 13 meter | 2 robots | 0.9% | 0.0% | 0.9% | 0.23% |
| | | | 0.0% | 0.0% | | |
| | | | 1.8% | 0.7% | | |
| | | 3 robots | 0.0% | 0.0% | 0.0% | 0.0% |
| | | | 0.0% | 0.0% | | |
| | | | 0.0% | 0.0% | | |
| | | 4 robots | 0.0% | 0.0% | 0.0% | 0.0% |
| | | | 0.0% | 0.0% | | |
| | | | 0.0% | 0.0% | | |
| | 10 meter | 2 robots | 0.0% | 0.0% | 1.3% | 0.77% |
| | | | 1.5% | 0.9% | | |
| | | | 2.4% | 1.4% | | |
| | | 3 robots | 0.0% | 0.0% | 0.43% | 0.2% |
| | | | 1.3% | 0.6% | | |
| | | | 0.0% | 0.0% | | |
| | | 4 robots | 0.0% | 0.0% | 0.0% | 0.0% |
| | | | 0.0% | 0.0% | | |
| | | | 0.0% | 0.0% | | |
| | 7 meter | 2 robots | 3.8% | 1.8% | 3.63% | 2.06% |
| | | | 5.5% | 2.8% | | |
| | | | 1.6% | 1.6% | | |
| | | 3 robots | 1.7% | 0.0% | 2.67% | 1.3% |
| | | | 1.8% | 1.2% | | |
| | | | 4.5% | 2.7% | | |
| | | 4 robots | 2.8% | 1.5% | 2.3% | 0.87% |
| | | | 1.8% | 0.7% | | |
| | | | 2.3% | 0.4% | | |

FIG 6B

| Column | 1 | 2 | 3 | 4 | 5 | 6 |
|---|---|---|---|---|---|---|
| | $r_{com}$ | n | double polygons | | double polygons (average) | |
| | | | allocated | processed | allocated | processed |
| 600 | 4 meter | 2 robots | 16.3% | 12.7% | 17.53% | 12.07% |
| | | | 23.2% | 21.1% | | |
| | | | 13.1% | 2.4% | | |
| | | 3 robots | 10.4% | 3.6% | 14.43% | 9.2% |
| | | | 17.3% | 13.1% | | |
| | | | 15.6% | 10.9% | | |
| | | 4 robots | 14.8% | 12.4% | 13.8% | 10.77% |
| | | | 16.9% | 13.6% | | |
| | | | 9.7% | 6.3% | | |

FIG 7

701 — Specification of the part domain and provisory assignment

702 — Transmission of the assignment notification

703 — Receipt of the assignment rejection notification

Yes → 704 — Remove proviso, assignment invalid

No → 705 — Remove proviso, assignment valid ic and Automation (ICRA), 1998, pp. 1779-1781.
SYSTEM FOR ASSIGNING ONE OF MANY PART DOMAINS IN A DOMAIN TO ONE OF MANY MOBILE UNITS

CROSS REFERENCE TO RELATED APPLICATIONS

This application is based on and hereby claims priority to German Application No. 101 50 423.3 filed on Oct. 11, 2001, the contents of which are hereby incorporated by reference.

BACKGROUND OF THE INVENTION

1. Field of the Invention

The invention relates to an assignment of a part domain of a whole domain which is divided into a plurality of part domains to one of a plurality of mobile units.

2. Description of the Related Art

A division of a whole domain into a plurality of part domains and subsequent assignment of one or a plurality of these part domains to mobile units is normally done when a plurality of mobile units jointly and coordinatedly process a large whole domain, for example when a hall is cleaned by a plurality of cleaning robots, as described in H. Endres, W. Feiten, and G. Lawitzky, Field Test of a Navigation System: Autonomous Cleaning in Supermarkets, Int. Conf. on Robotics and Automation (ICRA), 1998, pp. 1779-1781.

Different methods or approaches are used for dividing the whole domain and for assigning the part domains to the plurality of robots. A static approach or static method and a dynamic approach or dynamic method are used.

In the case of a static method, i.e. in the case of a static division and assignment, each mobile unit is permanently assigned a predetermined part domain of a whole domain before commencement of an activity which will be carried out jointly by the mobile units, wherein the assignment can no longer be changed during the activity.

Various such static methods, differing only in the manner in which the whole domain is divided into part domains, are known from Hert et al., "Polygon Area Decomposition for Multiple-Robot Workspace Division", Special Issue of International Journal of Computational Geometry and Applications on Applied Computational Geometry, vol. 8, no. 4, 1998, pp. 437-466; Bast et al., "The Area Partitioning Problem", Proceedings of the 12th Canadian Conference on Computational Geometry, 2000, pp. 163-171; Bern et al., "Linear-size Nonobtuse Triangulation of Polygons", Discrete and Computational Geometry, vol. 14, 1995, pp. 411-428; Christou et al., "Optimal Equipartition of Rectangular Domains for Parallel Computation", Journal of Global Optimization, vol. 8, January, 1996, pp. 15-34; I. T. Christou, "Distributed Genetic Algorithms for Partitioning Uniform Grids", University of Wisconsin Madison, Dept. of Computer Sciences Technical Report MP-TR-96-09, 1996; Yackel et al., "Minimum Perimeter Domain Assignment", Mathematical Programming, vol. 78, no. 2, August 1997, pp. 283-303.

Hert et al. and Bast et al. disclose the cutting up of a whole domain into n adjacent part domains of equal size, wherein each part domain must contain a specific point, i.e. a starting point of a robot which is responsible for the respective part domain. The static methods disclosed in Hert et al. and Bast et al. are mathematically correct, but the resulting part domains or areas to be processed by robots are often unusable in practice.

The static approach disclosed in Bern et al. therefore seeks and specifies equally sized part domains of a whole domain, wherein the part domains preferably contain no sharp angles and can therefore be processed more effectively by robots.

Conversely, the static methods disclosed in Christou et al., I. T. Christou and Yackel et al. specify part domains of a whole domain such that the part domains have a smallest possible diameter in each case and therefore normally also a small size. It is thereby intended that robots, each processing one of the part domains, encounter each other less frequently at a boundary of the part domain they are to process and therefore the danger of a collision is reduced.

A significant disadvantage of these known static methods, in particular due to the permanent assignment of part domains in these methods, is that such methods are extremely inflexible and cannot be dynamically adapted to new situations.

If one of a plurality of robots fails, for example, its work or its part domain to be processed is not taken over by one of the other robots. This part domain remains unprocessed in this case.

The dynamic method provides the opposite, i.e. a dynamic division and assignment of part domains. With this type of method, the part domains are first divided during an activity of the mobile units. The assignment of the part domains takes place in a plurality of time-staggered stages.

As a result of these dynamics, the part domains which are currently assigned to a mobile unit change dynamically during the activity of the mobile units. In this case, therefore, a work task is not permanently predefined for the mobile units, but is first dynamically adapted to environmental conditions and/or boundary conditions during the activity of the mobile units.

A disadvantage of the dynamic division and assignment of part domains is that the mobile units must remain in regular communication contact with each other, in order tell each other about notifications or changes. This communication is normally implemented by a global communication network via which the mobile units communicate with each other.

One such method, being at least partly dynamic, is disclosed in Hert et al., Multiple-Robots Motion Planning=Parallel Processing+Geometry, 2001. In the mixed-dynamic method disclosed in Hert et al., which method combines a static approach with a dynamic approach, a whole domain is divided into (n+1) part domains before the start of a processing activity by mobile units. n part domains are distributed among the mobile units in accordance with the static approach described above. The (n+1)th part domain is dynamically divided among the mobile units at the end of the processing activity.

However, since this mixed-dynamic method features mainly static method parts, it also exhibits the disadvantages of such static methods as described above.

SUMMARY OF THE INVENTION

An object of the invention is therefore to specify a method for assigning a part domain of a whole domain which is divided into a plurality of part domains to one of a plurality of interacting mobile units, the method being flexible and adaptable to changed or changing boundary conditions during a processing of the whole domain by the mobile units.

In the method for assigning a part domain of a whole domain which is divided into a plurality of part domains to one of a plurality of mobile units, a part domain of the whole domain which is divided into a plurality of part domains is specified and provisionally assigned to the one of the plurality of mobile units.

The one of the plurality of mobile units transmits an assignment notification which indicates the assignment of the part domain of the whole domain which is divided into a plurality of part domains to the one of the plurality of mobile units.

The proviso is removed and the assignment of the part domain becomes valid if the one of the plurality of mobile units does not receive an assignment rejection notification from at least one other of the plurality of mobile units, the assignment rejection notification indicating a rejection of the assignment of the part domain. Otherwise the proviso is removed and the assignment of the part domain becomes invalid.

The system for assigning a part domain of the whole domain which is divided into a plurality of part domains to one of a plurality of mobile units includes an assignment unit which allows the specification of the part domain to be assigned and the provisional assignment of the part domain to the one of the plurality of mobile units.

The system also includes a communication unit which allows the transmission of an assignment notification which indicates the assignment of this part domain of the whole domain which is divided into a plurality of part domains to the one of the plurality of mobile units.

The assignment unit is also configured in such a way that the proviso can be removed and the assignment of the part domain becomes valid if the one of the plurality of mobile units does not receive an assignment rejection notification from at least one other of the plurality of mobile units, the assignment rejection notification indicating a rejection of the assignment of this part domain, otherwise the proviso can be removed and the assignment of this part domain becomes invalid.

A computer program and computer program product according to the invention also include those computer programs or computer program products which are implemented decentrally, i.e. distributed over a plurality of systems or divided into a plurality of individual computer programs or computer program products, and execute a method according to the invention as an entirety or while interacting as an entirety.

The developments described below relate both to the method and to the system. The invention and the developments described below can be implemented both in software and in hardware, for example using a special electric circuit.

In one embodiment, the provisional specification and/or assignment of the part domain is done when the one of the plurality of mobile units is at a predeterminable assignment distance, or at less than the predeterminable assignment distance, in relation to the part domain.

Furthermore, the provisional specification and/or assignment of the part domain can be done actively by the one of the plurality of mobile units, i.e. by a request for the part domain by the one of the plurality of mobile units, or also passively, i.e. by assignment to the one of the plurality of mobile units by a third party.

In a further embodiment, the provisional specification and/or assignment of the part domain is done during a processing of other part domains of the whole domain by the mobile units. Interruptions or delays in the processing of the part domains can thereby be avoided.

The assignment notification can also include an importance notification relating to the part domain to be assigned, the importance notification describing how important the assignment of the part domain to be assigned is for the one of the plurality of mobile units.

A connectivity graph as disclosed in J. C. Latombe, Robot Motion Planning, Kluwer Academic Publishers, Boston, 1991 can be used for specifying the part domain to be assigned to the one of the plurality of mobile units.

It is also effective—because it is beneficial to processing—to specify the part domain, which is to be provisionally assigned, in such a way that the processing domain produces an area which is as compact as possible.

The part domain which is assigned to the one of the plurality of mobile units can also be combined with further part domains which are assigned to the one of the plurality of mobile units, thereby forming a processing area.

A processing path for the one of the plurality of mobile units can be determined for such a processing domain by using a path planning method. Path planning methods are disclosed in Arkin E. M. et al., "Approximation Algorithms for Lawn Mowing and Milling", Angewandte Mathematik and Informatik, Universität zu Köln, Report No. 97.255, 1997 or DE 198 04 195 A1, for example.

It is also effective in terms of processing for each of the plurality of mobile units to store a map of the whole domain, in which are entered at least the part domains which are assigned to the mobile unit concerned. The assigned part domain is then additionally entered into the map of the one of the plurality of mobile units.

In a development, an exchange of notifications between the plurality of mobile units takes place in such a way that the plurality of mobile units exchange notifications with each other whenever two of the plurality of mobile units are able to communicate. This is possible when two mobile units which have been configured for communication, i.e. configured for sending and receiving messages, are at a predeterminable communication distance, or at less than the predeterminable communication distance, in relation to each other.

A global communication network is not necessary in this case. The notifications are successively forwarded from one of the plurality of mobile units to another of the plurality of mobile units. This exchange of notifications makes it possible to carry out a map synchronization for the maps of the plurality of mobile units.

An agreement method can also be carried out if the part domain assigned to the one of the plurality of mobile units has already been assigned to another of the plurality of mobile units. This agreement method then provides for definitively assigning the part domain to one of the two mobile units.

In one embodiment, the invention is used in the cleaning of a whole domain by a plurality of cleaning robots. In this case, the plurality of mobile units are the cleaning robots. The whole domain to be cleaned is the whole domain.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The procedure described below in the context of the exemplary embodiment is based on a dynamic division of a room to be cleaned by cleaning robots.

Fundamentals of the Procedure

Figure 1:
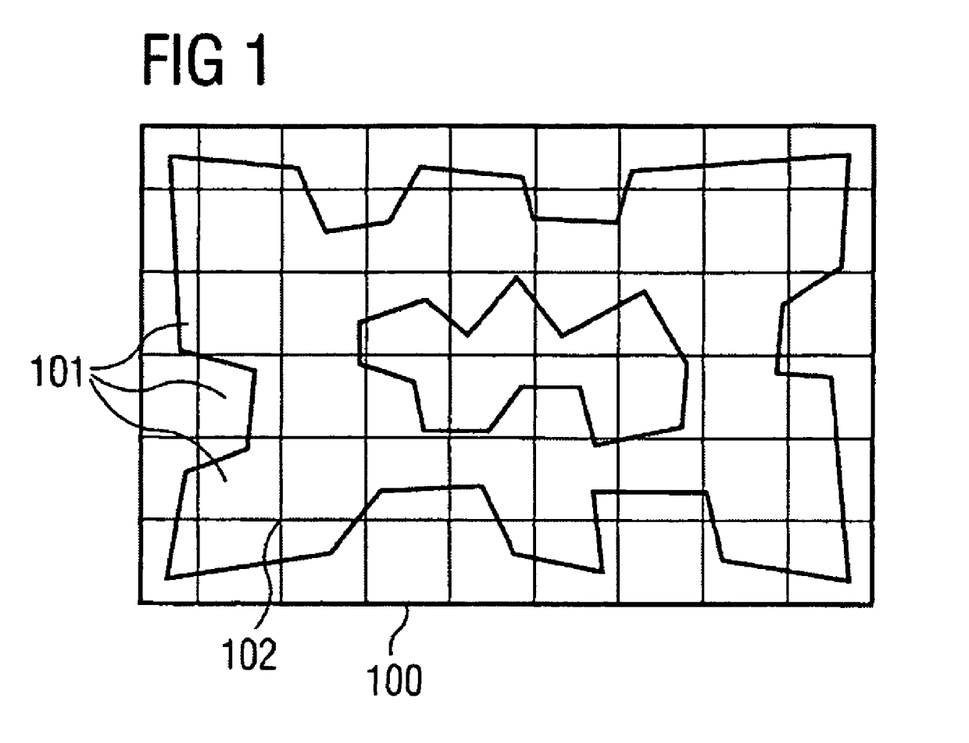
FIG. 1 is a drawing of a room 100 to be cleaned, the room being subdivided into polygons 101 in accordance with an exemplary embodiment.

The fundamental idea, which forms the basis of the procedure described below, is to subdivide the room 100 to be cleaned into individual polygons 101, i.e. part domains 101, as illustrated in FIG. 1.

The individual robots then allocate and clean these polygons 101. In this case, allocating a polygon 101 means that a robot undertakes to clean a specific polygon 101 and declares this.

Unlike other known dynamic methods, the procedure described below does not require that the individual robots be able to communicate with each other at all times. Consequently a global communication network is not required. It is entirely sufficient if the robots can communicate from time to time in order to exchange notifications.

Procedure

The procedure in the exemplary embodiment is based on a dynamic division of the room 100 to be cleaned. The room 100 is first divided into polygons 101. Individual polygons 101 are then selected and allocated using a connectivity graph (FIG. 2b, 210).

After a robot has allocated one or a plurality of polygons, it begins to clean them. When a robot has allocated or cleaned polygons, it naturally must notify the other robots of this, since they would otherwise allocate and clean these polygons also. This is not always possible, however, since the individual robots cannot always communicate with each other.

Figure 3:
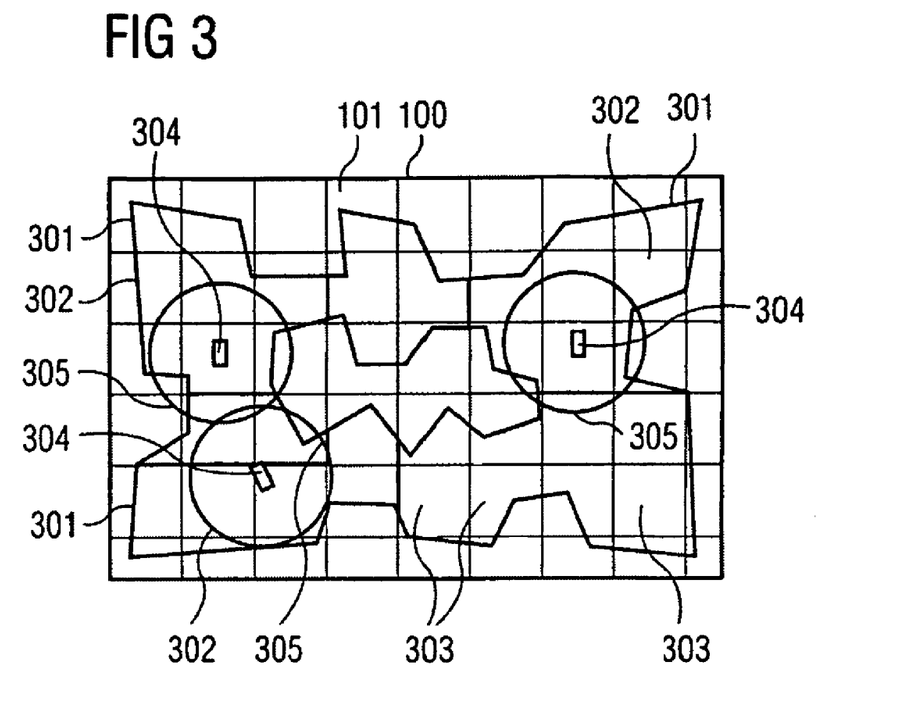
FIG. 3 is a drawing of a room 100 to be cleaned, three cleaning robots 304, communication distances 305 of the three robots 304, assigned cleaned part domains 301, assigned uncleaned part domains 302 and unassigned uncleaned part domains 303 in accordance with an exemplary embodiment.

The following assumes that two robots can communicate with each other when their communication distance is less than a predetermined distance. In this context, the predetermined communication distance represents a communication radius of a robot (FIG. 3, 305).

The work of a robot is complete when it knows that all polygons are allocated and when it has cleaned all the polygons allocated to it.

Since robots can meet in the procedure and can therefore collide in the worst possible case, collision avoidance is very important. A special decentralized collision avoidance method as described in Jäger et al., "Decentralized Collision Avoidance, Deadlock Detection and Deadlock Resolution for Multiple Mobile Robots", Int. Conf. On Intelligent Robots and Systems (IROS), 2001 is used for collision avoidance.

Possible enhancements and alternatives to the exemplary embodiment are described below.

Division into Polygons

The room 100 which has to be divided is overlaid with a grid 102 (FIG. 1), wherein a number of polygons are created.

The room is divided among the robots on the basis of these polygons 101 as the robots allocate and clean the individual polygons 101 one by one.

Figure 2A:
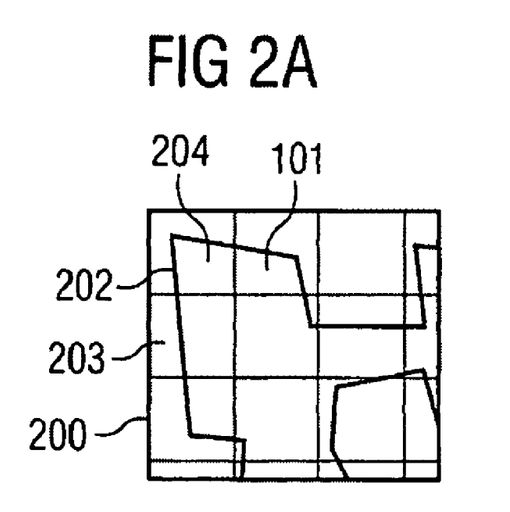
FIG. 2a is a drawing of a part 200 of a room 100 to be cleaned, the part being subdivided into polygons 101, 202, 203 in accordance with an exemplary embodiment.
Figure 2B:
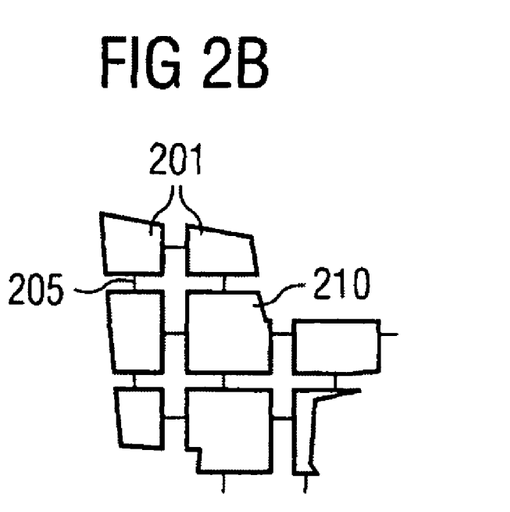
FIG. 2b is a drawing of an associated connectivity graph 210 for the part of a room to be cleaned in accordance with an exemplary embodiment.

Creation of a Connectivity Graph (FIG. 2a and FIG. 2b)

A connectivity graph 210 is created by establishing a node 201 for every polygon 101 and establishing an edge 206 for every polygon pair 202-203 which has a shared edge 204. The connectivity graph 210 provides information about how the individual polygons 101 are interconnected.

Notifications which are stored at the nodes 201 in the connectivity graph indicate whether a polygon is already allocated and whether a polygon 101 has already been cleaned.

A connectivity graph 210 is a known concept in robotics J. C. Latombe, but is mainly used for navigation purposes.

Selection of the Polygons to be Allocated

The selection of the polygons which are allocated by a robot takes place in accordance with two principles. The first principle is that the robots always ensure that they have a reserve of a few polygons to be processed.

Polygons to be processed are polygons which have been allocated but not yet fully processed. The second principle is that further polygons are added when it appears advantageous to do so.

One restriction is that a polygon can in principle be allocated only if it is within the transmission range of the robot concerned, i.e. a robot must be less than a predetermined assignment distance from the center of the polygon.

A suitable selection of the communication distance and of the assignment distance ensures that two robots wanting to allocate the polygon at the same time can communicate with each other.

If a robot has no more polygons to process and cannot allocate a new polygon because none is within transmission range, the robot moves towards a new polygon.

Allocation in Reserve (FIG. 3)

Since a robot always allocates a few polygons in reserve 302, it begins to allocate again as soon as the number of polygons 302 to be processed falls below a specified threshold.

A restriction in this case is that the robot only allocates new polygons if the zone of the polygons which are to be processed is adjacent. This restriction is necessary in order to prevent the excessive fracturing of an area which is to be processed.

The selection of the polygons to be newly allocated is done according to the following criteria:

a) Only polygons which have not already been allocated by other robots (or by the robot itself) are allocated.

b) Polygons must be adjacent to the polygons which are already allocated.

c) The newly allocated polygons should, in combination with the polygons which have just been processed, have the smallest possible diameter. This reduces the danger of a collision with other robots on the one hand Christou et al., I. T. Christou, Yackel et al., and on the other hand it benefits the cleaning because a compact area is advantageous in this case.

Figure 4:
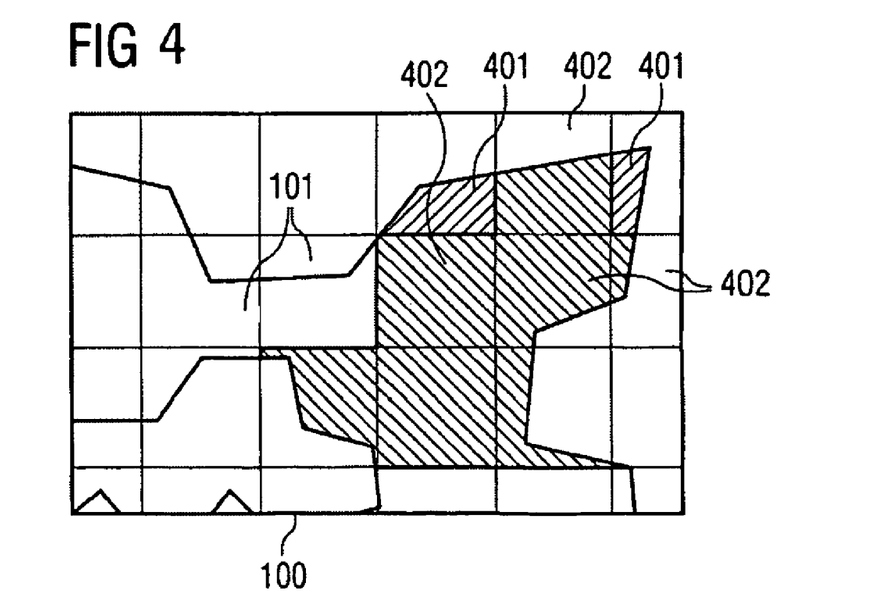
FIG. 4 is a drawing of a room 100 to be cleaned, with two isolated part domains 401 (polygons) in accordance with an exemplary embodiment.

Special Allocation (FIG. 4)

The special allocation is essentially for preventing isolated polygons 401. A polygon is considered isolated if it has no more unallocated neighboring polygons 402.

Without special handling of such isolated polygons 401, it is possible that all polygons 101 in the neighborhood of an isolated polygon 401 might already be cleaned, without the isolated polygon 401 being cleaned. This means that a robot might be required to make a long detour in order nonetheless to processes the remaining isolated polygon 401.

Therefore, if a robot finds that the area which it is currently processing borders an isolated polygon 401, the robot allocates this isolated polygon 401.

Figure 7:
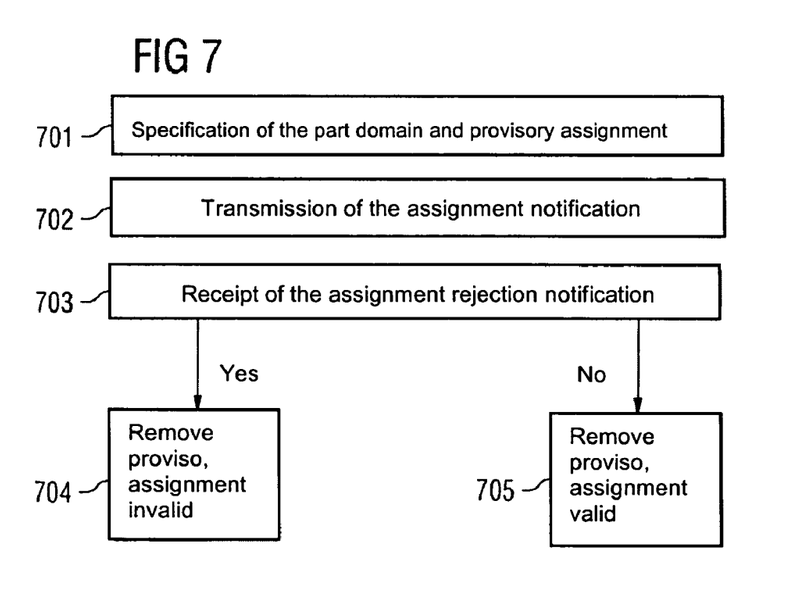
FIG. 7 is a flowchart of operations during an assignment of a part domain in accordance with an exemplary embodiment.

Allocation of a Polygon (FIG. 3 and FIG. 7)

Supposing that a robot has now selected a polygon for allocation 701, it must agree this with all other robots which also wish to allocate the polygon. This is performed by a "Provisional Allocation Procedure" (AVV) described below (FIGS. 7, 701 to 705).

The polygon for allocation must be within transmission range, thereby ensuring that the robots can communicate in this case.

The selected allocation strategy or AVV is based on a mixture of a selection algorithm Chang et al., "An Improved Algorithm for Decentralized Extrema-finding in Circular Configurations of Processes", Communications of the ACM, vol. 22, 1979, pp. 281-283 and a Contract Net Protocol R. G. Smith, "The Contract Net Protocol: High-level Communication and Control in a Distributed Problem Solver", In IEEE Transactions on Computers, number 12 in C-29, 1980, pp. 1104-1113 in this case.

a) According to this allocation strategy, a robot which wishes to allocate a polygon 701 sends an AllocationRequest message 702 to all the other robots it is able to communicate with. The message contains the ID of the polygon which the robot wishes to allocate, and an Importance Value (IV) which indicates the importance to the robot of this allocation.

The IV is determined as follows:

$$IV(poly) = 1 - \frac{\sum_{p \in SP} \frac{\min(dist(p, poly), MAXDIST)}{MAXDIST}}{|SP|} \quad (1)$$

where SP is a number of generated polygons, dist( . . . , . . . ) is a function for determining the distance between two polygon centers, min( . . . ) is a function for determining a minimum, I . . . I is an amount function, MAXDIST is a maximum distance between two polygon centers, and poly or p is an index for a polygon.

b) If a robot receives an AllocationRequest message,
   it sends an AllocationRefuse message 703, 704 if it has itself already sent an AllocationRequest message for the same polygon and its IV is greater than the IV of the received AllocationRequest message (if the IV is the same, a decision is made on the basis of the robot IDs),
   it sends an AllocationAccept message 703, 705 if it has itself already sent an AllocationRequest message for the same polygon and its IV is smaller than the IV of the received AllocationRequest message,
   it sends an AllocationAccept message 703, 705 if it has not itself sent an AllocationRequest message for the polygon, c) If a robot receives an AllocationRefuse message, it knows that its allocation cannot succeed and cancels it 704.

d) If a robot receives AllocationAccept messages in response to all the AllocationRequest messages is has sent, the allocation is successful and is complete. The same applies accordingly if the robot does not receive any AllocationRefuse messages 703, 705 (see below).

e) After a robot has allocated a new polygon, it notifies all the others (see 'Forwarding of notifications' below).

It should also be noted that during the process of allocation, the number of robots participating in the allocation can change. New robots can come into communication transmission range, for example, or robots which are already known can move too far away.

Clearly this must also be considered in the allocation strategy described above or in the AVV. Consequently, it might be necessary to send further AllocationRequest messages to newly arriving robots (Point a), or it might not be necessary to wait for all AllocationAccept messages (Point d) 703, 705.

Forwarding of Notifications (FIG. 3)

Since the individual robots are not always able to communicate with each other due to the limited communication distance 305, each robot develops its own local view of allocated and cleaned polygons during the course of processing or cleaning the room.

For example, if one robot allocates a polygon and another robot is not within communication transmission range at that moment, the other robot clearly knows nothing of the allocation. Therefore it has a different view.

In order to synchronize the local views of the robots, they exchange notifications about allocated 302 and cleaned 301 zones as soon as they are able to communicate with each other. They therefore synchronize their local views and develop a common view.

The smaller the communication radius 305, the less frequently the robots can communicate with each other, and the greater the variation in the individual local views of the robots.

If the local views vary too much, polygons are allocated and cleaned more than once as a result.

Enhancements and alternatives to the exemplary embodiment are described below.

a) The introduction of assembly points where the robots meet at regular intervals in order to synchronize their local views.

b) The use of a special robot which does not clean but travels regularly back and forth among the other robots in order to distribute notifications.

c) The release of a polygon which has already been allocated if another robot has completed its work and could therefore process this polygon.

d) The dynamic adaptation of the number of polygons which can be allocated in reserve, i.e. if only very few polygons overall remain to be allocated, fewer polygons are allocated in reserve (whereby the robots all finish at approximately the same time).

Figure 5:
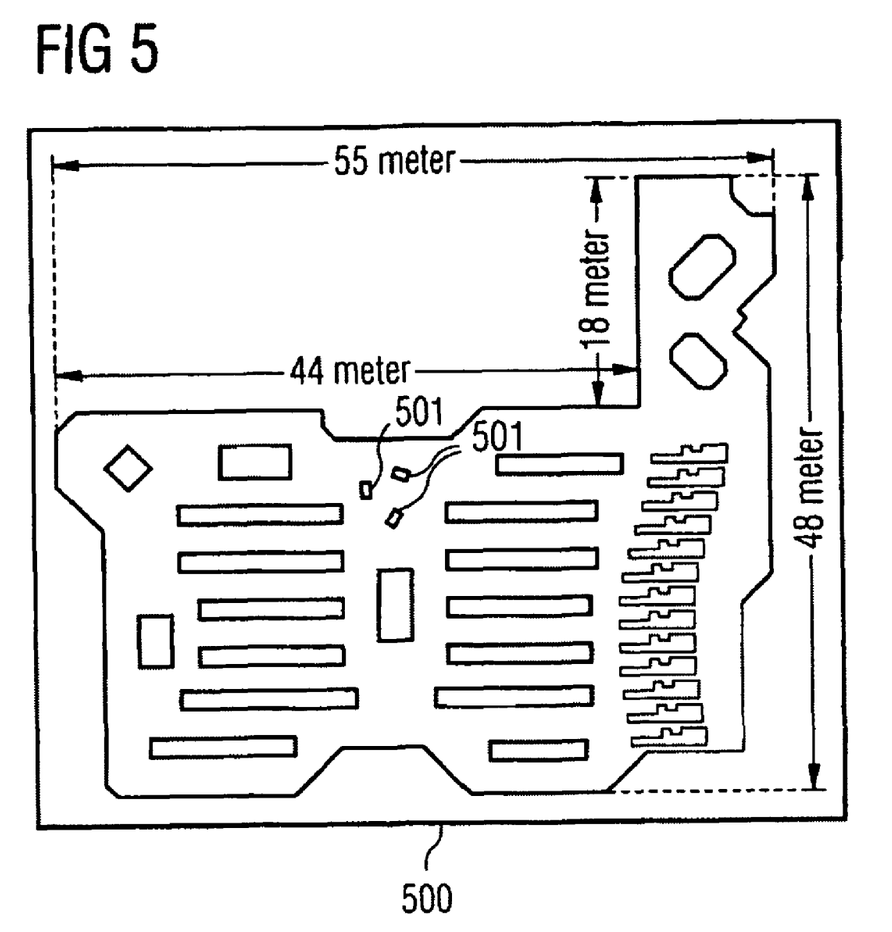
FIG. 5 is a drawing of a ground plan 500 of a supermarket to be cleaned.
Figure 6A:
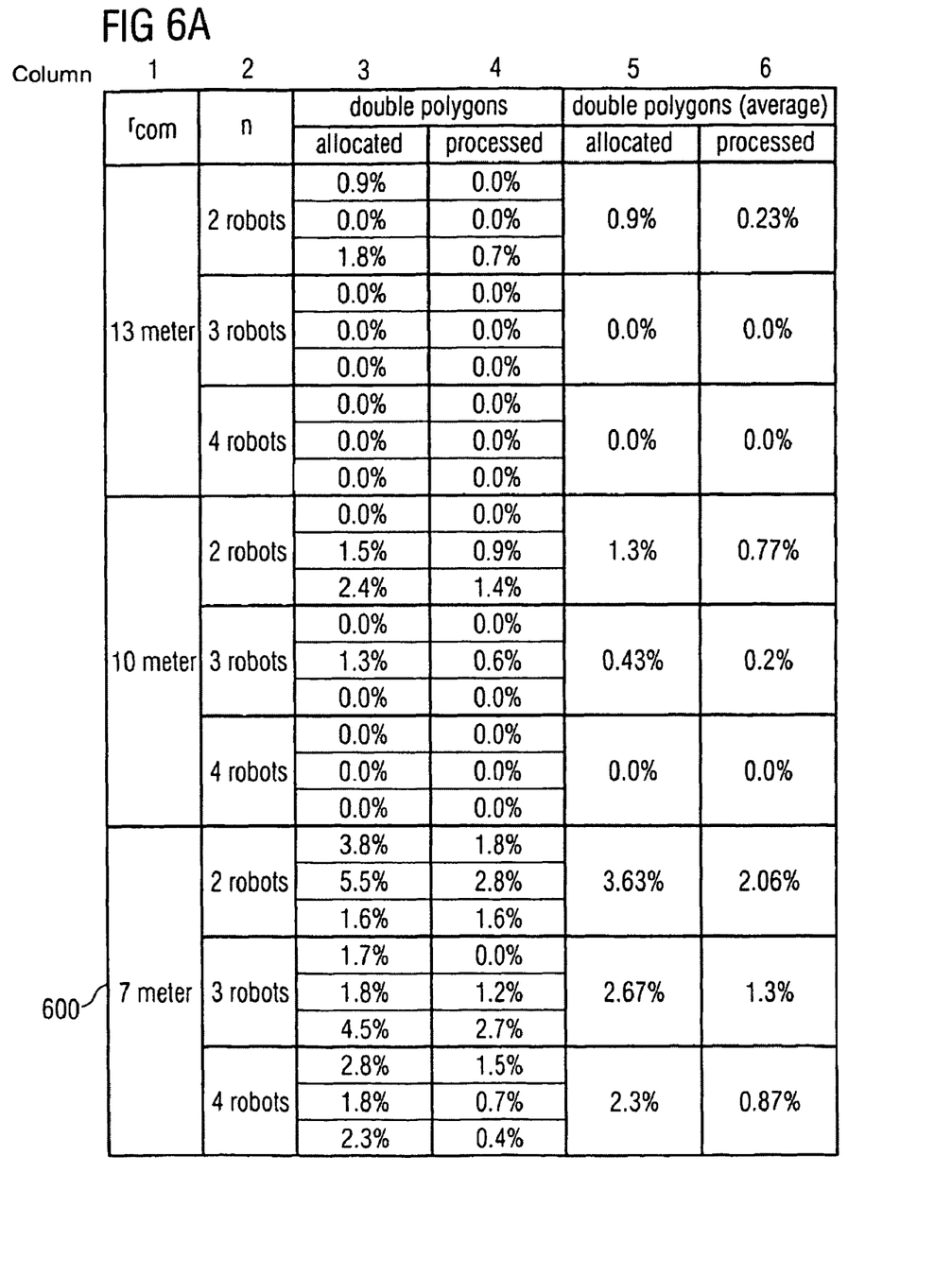
FIGS. 6A and 6B are a table of simulation results 600.
Figure 6B:
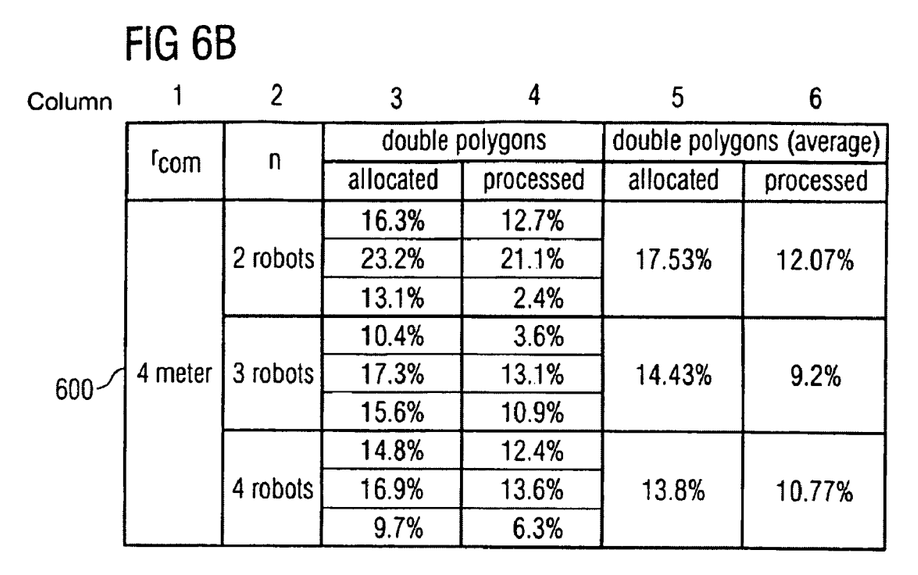

Simulation and Simulation Results (FIG. 5 and FIG. 6)

Under the heading 'Forwarding of notifications' above, it was shown that the limited communication opportunities of the robots result in different local views of the robots, which can then result in unnecessary work.

In order to establish the extent of the effect of the local views on the cleaning performance, simulations are carried out.

A CAD plan 500 of a large supermarket (FIG. 5) was used as a basis for this. FIG. 5 shows the supermarket and three (cleaning) robots 501.

Three simulations were carried out in each case for different communication radii and quantities of robots.

FIG. 6 shows the results of the simulations in tabular format, where the first two columns 1 and 2 of the table 600 represent the communication radius and the relevant quantity of robots in each case.

Columns 3 and 4 of the table 600 specify the proportion of polygons which were double allocated and double cleaned. In this case, the values always relate to the total domain to be cleaned. The final two columns 5 and 6 of the table 600 show the average values of the three simulations.

The table 600 in FIG. 6 demonstrates that the proportion of duplicated work increases when the communication radius or the quantity of robots is reduced. When the communication radius is smaller, the robots cannot communicate with each other so often. When more robots are used, the notifications are distributed more quickly.

The described method is a fully dynamic method. The division of the room takes place entirely at runtime.

Furthermore, the method is based on a fully decentralized approach. There is no need for central components, nor is there a requirement for global coordination.

The method does not presuppose a global communication network. The worst consequence of the restricted communication abilities of the robots is duplication of effort, though this is limited even under unfavorable conditions. The simulation results substantiate this.

The invention has been described in detail with particular reference to preferred embodiments thereof and examples, but it will be understood that variations and modifications can be effected within the spirit and scope of the invention.

The invention claimed is:

1. A method for assigning a part domain of a whole domain which is divided into part domains to one of a plurality of interacting mobile units to process a specific area, comprising:
    specifying a part domain of the whole domain which is divided into part domains for assignment provisionally to one of the mobile units, wherein the part domains are selected and allocated using a connectivity graph;
    transmitting to the one of the plurality of mobile units an assignment notification indicating the assignment of the part domain to the one of the mobile units provisionally;
    making the assignment of the part domain non-provisional if the one of the mobile units does not receive an assignment rejection notification, indicating a rejection of the assignment of the part domain, from at least one other of the plurality of mobile units;
    notifying the other mobile units when one mobile unit allocates at least one part domain of the whole domain;
    making the assignment of the part domain invalid if the one of the mobile units receives at least one assignment rejection notification;
    ensuring each mobile unit has a reserve of part domains to process;
    allocating additional part domains when the number of part domains to be processed by each mobile unit falls below a specific threshold;
    selecting a newly allocated part domain adjacent to the part domains which are already allocated;
    storing in each of the mobile units a local map of the whole domain in which at least validly assigned part domains thereof are identified; and
    exchanging notifications whenever at least two of the mobile units are within a predeterminable communication distance, and synchronizing local views of the map of the whole domain of the at least two mobile units to develop a common view of the whole domain, whereby global coordination is not required.

2. The method as claimed in claim 1, wherein at least one of said specifying and said transmitting of the assignment notification is performed when the one of the mobile units is at least a predeterminable assignment distance from the part domain.

3. The method as claimed in claim 2, wherein at least one of said specifying and said transmitting of the assignment notification is included in a request for the part domain by the one of the mobile units.

4. The method as claimed in claim 3, wherein at least one of said specifying and said transmitting of the assignment notification is performed during a processing of other part domains of the whole domain by the mobile units.

5. The method as claimed in claim 1, wherein the assignment notification includes an importance notification describing how important the assignment of the part domain is for the one of the mobile units.

6. The method as claimed in claim 5, further comprising combining the part domain provisionally assigned to the one of the mobile units with other part domains assigned to the one of the mobile units to form a processing area.

7. The method as claimed in claim 6, wherein said specifying and combining results in the processing area being as compact as possible.

8. The method as claimed in claim 7, further comprising determining a processing path for the processing area using a path planning method.

9. The method as claimed in claim 8, further comprising identifying the part domain in the map of the one of the mobile units when the assignment is made non-provisional.

10. The method as claimed in claim 9, further comprising carrying out an agreement method if the part domain assigned to the one of the mobile units has already been assigned to another of the mobile units.

11. The method as claimed in claim 10, wherein the mobile units are cleaning robots used to clean the whole domain.

12. A system for assigning a part domain of a whole domain divided into part domains to one of a plurality of mobile units to process a specific area, comprising:
    an assignment unit specifying a part domain of the whole domain and assigning the part domain to the one of the mobile units provisionally, wherein the part domains are selected and allocated using a connectivity graph;
    a communication unit transmitting an assignment notification indicating assignment of the part domain to the one of the mobile units provisionally and receiving an assignment rejection notification from at least one other mobile unit if the assignment is rejected, said assignment unit making the assignment of the part domain valid if no assignment rejection notification is received within a predetermined time and invalidating the assignment of the part domain if at least one assignment rejection notification is received;
    a notification unit notifying the other mobile units when one mobile unit allocates at least one part domain of the whole domain;
    a reservation unit ensuring each mobile unit has a reserve of part domains to process;
    an allocation unit allocating additional part domains when the number of part domains to be processed by each mobile unit falls below a specific threshold;
    a selection unit selecting a newly allocated part domain adjacent to the part domains which are already allocated;
    a storing unit storing in each of the mobile units a local map of the whole domain in which at least validly assigned part domains thereof are identified; and
    a synchronization unit exchanging notifications whenever at least two of the mobile units are within a predeterminable communication distance, and synchronizing local views of the map of the whole domain of the at least two mobile units to develop a common view of the whole domain, whereby global coordination is not required.

13. A computer software product embodied on at least one non-transitory computer-readable medium storing instructions to control at least one processor to perform a method to process a specific area, comprising:

specifying a part domain of the whole domain which is divided into part domains for assignment provisionally to one of the mobile units, wherein the part domains are selected and allocated using a connectivity graph;

transmitting to the one of the plurality of mobile units an assignment notification indicating the assignment of the part domain to the one of the mobile units provisionally;

making the assignment of the part domain non-provisional if the one of the mobile units does not receive an assignment rejection notification, indicating a rejection of the assignment of the part domain, from at least one other of the plurality of mobile units;

notifying the other mobile units when one mobile unit allocates at least one part domain of the whole domain;

making the assignment of the part domain invalid if the one of the mobile units receives at least one assignment rejection notification;

ensuring each mobile unit has a reserve of part domains to process;

allocating additional part domains when the number of part domains to be processed by each mobile unit falls below a specific threshold;

selecting a newly allocated part domain adjacent to the part domains which are already allocated;

storing in each of the mobile units a local map of the whole domain in which at least validly assigned part domains thereof are identified; and exchanging notifications whenever at least two of the mobile units are within a predeterminable communication distance, and synchronizing local views of the map of the whole domain of the at least two mobile units to develop a common view of the whole domain, whereby global coordination is not required.

* * * * *